US012499950B2

(12) United States Patent
Birgade et al.

(10) Patent No.: US 12,499,950 B2
(45) Date of Patent: Dec. 16, 2025

(54) DECK-BASED ERASE FUNCTION

(71) Applicant: Micron Technology, Inc., Boise, ID (US)

(72) Inventors: Nikhil Birgade, Telangana (IN); Uday Bhasker V. Vudugandla, Telangana (IN)

(73) Assignee: Micron Technology, Inc., Boise, ID (US)

( * ) Notice: Subject to any disclaimer, the term of this patent is extended or adjusted under 35 U.S.C. 154(b) by 139 days.

(21) Appl. No.: 18/437,419

(22) Filed: Feb. 9, 2024

(65) Prior Publication Data
US 2024/0290392 A1 Aug. 29, 2024

Related U.S. Application Data

(60) Provisional application No. 63/447,839, filed on Feb. 23, 2023.

(51) Int. Cl.
*G11C 16/16* (2006.01)
*G11C 16/10* (2006.01)
*G11C 16/32* (2006.01)

(52) U.S. Cl.
CPC ............ *G11C 16/16* (2013.01); *G11C 16/102* (2013.01); *G11C 16/32* (2013.01)

(58) Field of Classification Search
CPC ....... G11C 16/16; G11C 16/102; G11C 16/32; G11C 16/0483
USPC .................................................... 365/185.29
See application file for complete search history.

(56) References Cited

U.S. PATENT DOCUMENTS

| 12,354,679 B2 * | 7/2025 | Fujimori ............ G11C 16/3445 |
| 2021/0382647 A1 * | 12/2021 | Lee ........................ G06F 3/0652 |
| 2023/0058836 A1 * | 2/2023 | Pachamuthu .......... G11C 16/10 |

* cited by examiner

Primary Examiner — Fernando Hidalgo
(74) Attorney, Agent, or Firm — Holland & Hart LLP

(57) ABSTRACT

Methods, systems, and devices for a deck-based erase function are described. A memory system may perform alternating erase operations and write operations on a virtual block configured with blocks constructed from half good blocks (HGBs). For example, the memory system may erase and subsequently write data to a first subset of HGBs associated with one or more memory dies of the memory system, before erasing and subsequently writing data to a second subset of HGBs associated with the one or more memory dies. In some cases, the memory system may determine the first subset of HGBs has been filled by the write operations, prior to erasing the second subset of HGBs. In other cases, the memory system may identify an idle time during writing to the first subset of HGBs, and begin erasing the second subset of HGBs during the idle time.

20 Claims, 5 Drawing Sheets

DECK-BASED ERASE FUNCTION

CROSS REFERENCE

The present application for patent claims priority to and the benefit of U.S. Provisional Application No. 63/447,839 by Birgade et al., entitled "DECK-BASED ERASE FUNCTION," filed Feb. 23, 2023 assigned to the assignee hereof, and is expressly incorporated by reference in its entirety herein.

TECHNICAL FIELD

The following relates to one or more systems for memory, including a deck-based erase function.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states in response to being disconnected from an external power source.

DETAILED DESCRIPTION

Figure 1:
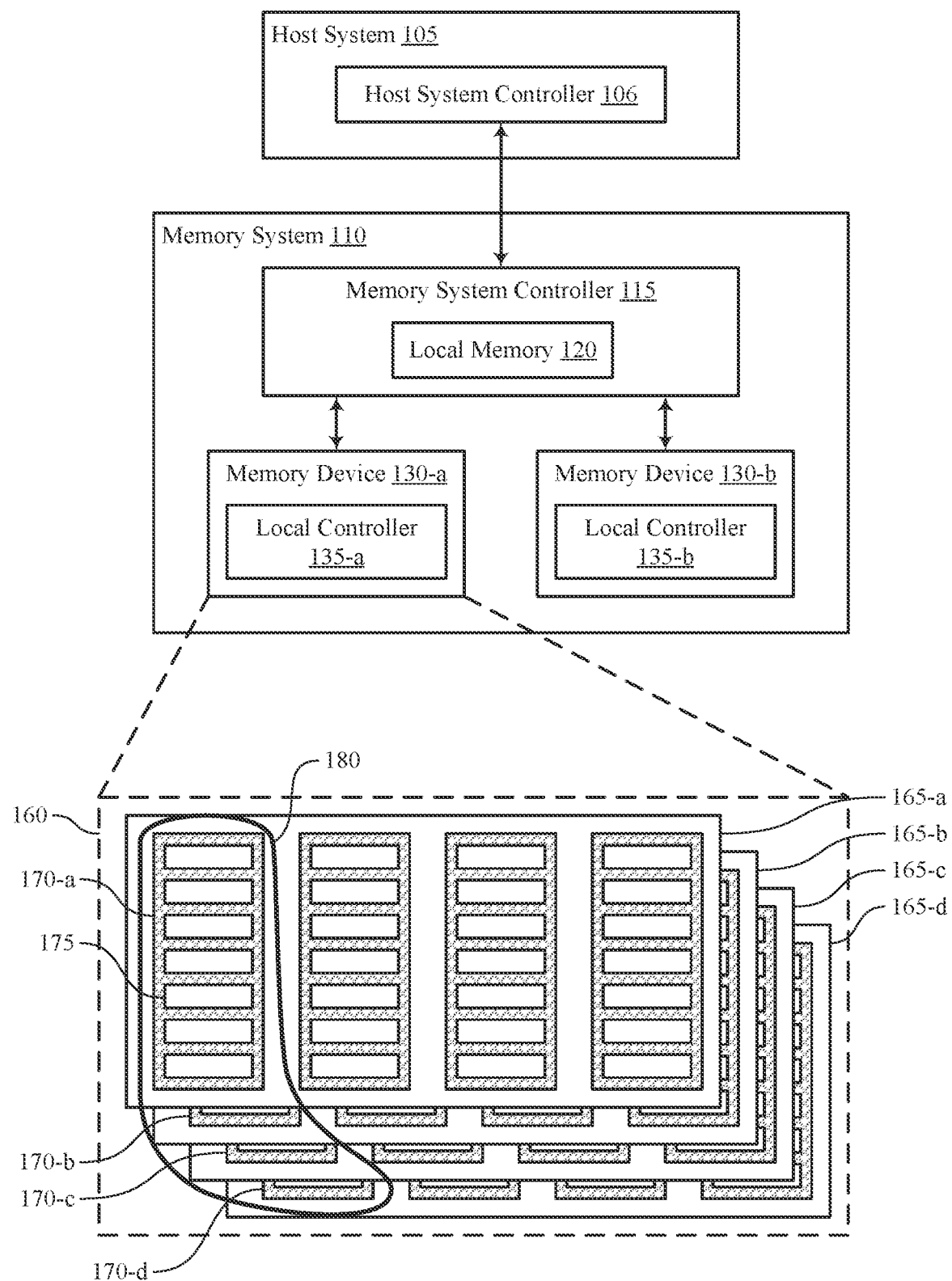
FIG. 1 illustrates an example of a system that supports a deck-based erase function in accordance with examples as disclosed herein.

A memory system may include one or more memory devices (e.g., memory dies) including non-volatile memory (e.g., NAND memory). In some cases, the memory system may include one or more virtual blocks (VBs), which may each include a group of blocks spanning the non-volatile memory of the one or more memory devices. In some examples, each VB may be configured with physical blocks of the one or more memory devices, or configured with blocks constructed (e.g., combined logically) using half good blocks (HGBs) of the one or more memory devices (e.g., blocks including functional word lines in a respective region of the blocks). For example, a VB may be configured with a group of blocks each constructed using an upper HGB (e.g., a block with functional word lines in an upper region of the block) from an upper deck (e.g., upper region) of the one or more memory devices combined with a respective lower HGB (e.g., a block with functional word lines in a lower region of the block) from a lower deck (e.g., lower region) of the one or more memory devices. In some cases, the memory system may perform write operations on the one or more VBs of the memory system. To enable a new VB for the write operations, the memory system may perform an erase operation on the blocks associated with the new VB. For example, if the new VB is configured with HGBs, the erase operation may include erasing the upper HGBs and the lower HGBs associated with the new VB prior to performing the write operations on the new VB. In such examples, the memory system may complete erasing the upper HGBs and the lower HGBs before beginning to perform the write operations on the new VB, resulting in relatively higher latency compared with memory systems not implementing HGBs.

In accordance with examples as disclosed herein, a memory system may be configured to perform a deck-based erase function, where the erase operations and the write operations are performed in alternating stages on a VB, such that a first group of HGBs (e.g., upper HGBs, lower HGBs) associated with the VB may be erased and written to before erasing and writing to a second group of HGBs associated with the VB. For example, the memory system may erase the upper HGBs and subsequently write to the upper HGBs, before erasing the lower HGBs and subsequently writing to the lower HGBs. In some cases, erasing and writing to the respective groups of HGBs may include erasing and writing to the respective decks (e.g., the upper deck, the lower deck) of the one or more memory devices. In some examples, the memory system may determine the first group of HGBs is full of data (e.g., from performing the write operations) before erasing the second group of HGBs. In other examples, the memory system may identify an idle time during performing the write operations on the first group of HGBs and begin erasing the second group of HGBs during the idle time. By supporting a deck-based erase function to perform the erase operations and the write operations in alternating stages, the memory system may benefit from relatively reduced latency (e.g., compared to prior implementations of HGBs), among other advantages.

Figure 2:
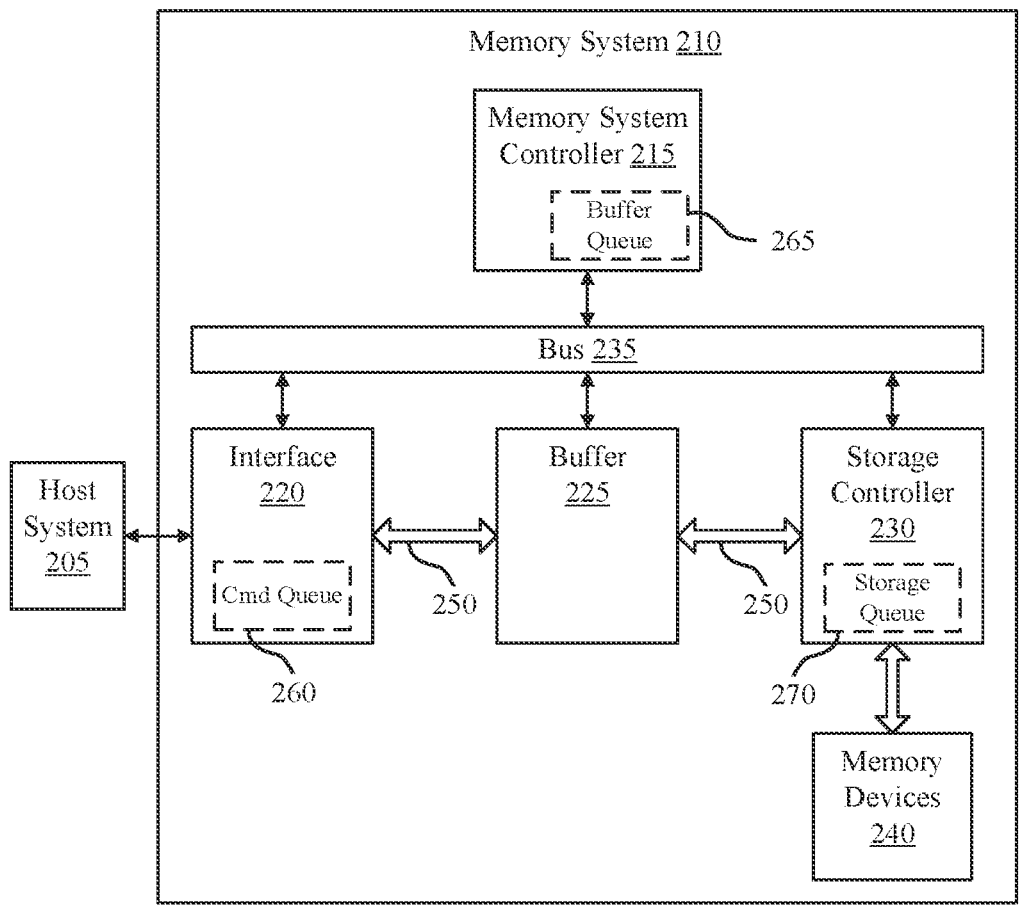
FIG. 2 illustrates an example of a system that supports a deck-based erase function in accordance with examples as disclosed herein.

Features of the disclosure are initially described in the context of systems, devices, and circuits with reference to FIGS. 1 and 2. Features of the disclosure are described in the context of a process flow with reference to FIG. 3. These and other features of the disclosure are further illustrated by and described in the context of an apparatus diagram and flowchart that relate to a deck-based erase function with reference to FIGS. 4 and 5.

FIG. 1 illustrates an example of a system 100 that supports a deck-based erase function in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as disclosed herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-$a$ and 130-$b$ are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as disclosed herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a VB 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a VB 180. In some cases, a VB 180 may include blocks 170 from different memory devices 130 (e.g., including blocks in one or more planes of memory device 130-a and memory device 130-b). In some cases, the blocks 170 within a VB 180 may have the same block address within their respective planes 165 (e.g., block 170-a may be "block 0" of plane 165-a, block 170-b may be "block 0" of plane 165-b, and so on). In some examples, a VB 180 may be configured with blocks 170 constructed (e.g., combined logically) using HGBs of the memory devices 130 (e.g., blocks including functional word lines in a respective region of the blocks 170). For example, a VB 180 may be configured with a group of blocks 170 each constructed using an upper HGB (e.g., a block with functional word lines in an upper region of the block) from an upper deck (e.g., upper region) of the one or more memory devices combined with a respective lower HGB (e.g., a block with functional word lines in a lower region of the block) from a lower deck (e.g., lower region) of the one or more memory devices. In some implementations, the two HGBs for each block 170 may be within a same respective plane of a same memory device 130.

In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support a deck-based erase function. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In accordance with examples as disclosed herein, the memory system 110 may be configured to perform a deck-based erase function to enable a new VB 180 for write operations. The deck-based erase function may include erase operations and write operations performed in alternating stages on a VB 180, such that a first group of HGBs (e.g., upper HGBs, lower HGBs) associated with the VB 180 may be erased and written to before erasing and writing to a second group of HGBs associated with the VB 180. For example, the memory system 110 may erase the upper HGBs and subsequently write to the upper HGBs, before erasing the lower HGBs and subsequently writing to the lower HGBs. In some cases, erasing and writing to the respective groups of HGBs may include erasing and writing to the respective decks (e.g., the upper deck, the lower deck) of the memory devices 130. In some examples, the memory system 110 may determine the first group of HGBs is full of data (e.g., from performing the write operations) before erasing the second group of HGBs. In other examples, the memory system 110 may identify an idle time during performing the write operations on the first group of HGBs and begin erasing the second group of HGBs during the idle time. By supporting a deck-based erase function to perform the erase operations and the write operations in alternating stages, the memory system 110 may benefit from relatively reduced latency (e.g., compared to prior implementations of HGBs).

FIG. 2 illustrates an example of a system 200 that supports a deck-based erase function in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) if the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

Once the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

In some cases, the memory system 210 may include one or more VBs, which may each include a group of blocks spanning non-volatile memory of the memory devices 240. In some examples, each VB may be configured with physical blocks of the memory devices 240 or may be configured with blocks constructed (e.g., combined logically) using HGBs of the memory devices 240 (e.g., blocks including functional word lines in a respective region of the blocks). For example, a VB may be configured with a group of blocks each constructed using an upper HGB (e.g., a block with functional word lines in an upper region of the block) from an upper deck (e.g., upper region) of the memory devices 240 combined with a respective lower HGB (e.g., a block with functional word lines in a lower region of the block) from a lower deck (e.g., lower region) of the memory devices 240. In some implementations, the two HGBs for each block may be within a same respective plane of the memory devices 240.

In accordance with examples as disclosed herein, the memory system 210 may be configured to perform a deck-based erase function to enable a new VB for write operations. The deck-based erase function may include erase operations and write operations performed in alternating stages on a VB, such that a first group of HGBs (e.g., upper HGBs, lower HGBs) associated with the VB may be erased and written to before erasing and writing to a second group of HGBs associated with the VB. For example, the memory system 210 may erase the upper HGBs and subsequently write to the upper HGBs, before erasing the lower HGBs and subsequently writing to the lower HGBs. In some cases, erasing and writing to the respective groups of HGBs may include erasing and writing to respective decks (e.g., regions) of the memory devices 240. In some examples, the memory system 210 may determine the first group of HGBs is full of data (e.g., from performing the write operations) before erasing the second group of HGBs. In other examples, the memory system 210 may identify an idle time during performing the write operations on the first group of HGBs and begin erasing the second group of HGBs during the idle time. By supporting a deck-based erase function to perform the erase operations and the write operations in alternating stages, the memory system 210 may benefit from relatively reduced latency (e.g., compared to prior implementations of HGBs).

Figure 3:
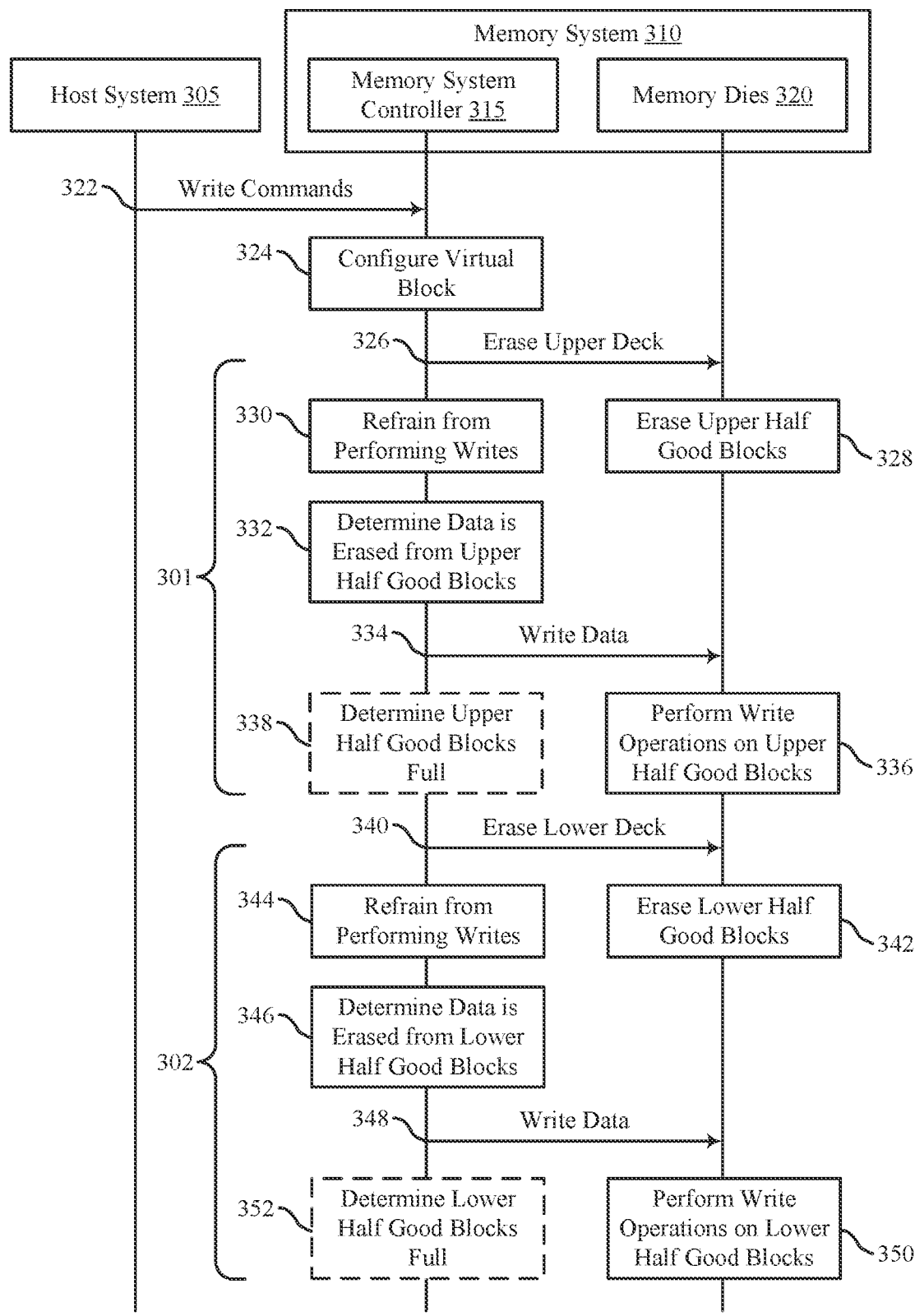
FIG. 3 illustrates an example of a process flow that supports a deck-based erase function in accordance with examples as disclosed herein.

FIG. 3 illustrates an example of a process flow 300 that supports a deck-based erase function in accordance with examples as disclosed herein. The process flow 300 may illustrate aspects or operations of a system 100 or a system 200 as described with reference to FIGS. 1 and 2, respectively. For example, the process flow 300 may depict operations at a host system 305 and a memory system 310, which may be examples of a host system 205 and a memory system 210, respectively, as described with reference to FIG. 2. In the following description of the process flow 300, the methods, techniques, processes, and operations may be performed in different orders or at different times. Further, certain operations may be left out of the process flow 300, or other operations may be added to the process flow 300.

In accordance with operations as described herein, the memory system 310 may be configured to perform a deck-based erase function, where erase operations and write operations are performed in alternating stages on a VB, such that a first group of HGBs associated with the VB may be erased and written to before erasing and writing to a second group of HGBs associated with the VB. By supporting the deck-based erase function to perform the erase operations and the write operations in alternating stages, the memory system may benefit from relatively reduced latency (e.g., compared to prior implementations of HGBs). Operations 301 may include steps associated with performing erase operations and write operations on a first group of HGBs, whereas operations 302 may include steps associated with performing erase operations and write operations on a first group of HGBs. In some cases, operations 302 may be performed prior to performing operations 301.

The memory system 310 may include a memory system controller 315, which may be an example of a memory system controller 215, as described with reference to FIG. 2. In some cases, the memory system controller 315 may be configured to perform operations on the memory system 310 in accordance with commands received from the host system 305. Additionally, the memory system 310 may include one or more memory dies 320, which may be examples of memory devices 130 or memory devices 240, as described with reference to FIGS. 1 and 2, respectively. Each memory die 320 may include one or more memory arrays of non-volatile memory (e.g., NAND memory). The memory arrays may include blocks of memory cells (e.g., NAND memory cells) accessible via word lines (e.g., functional word lines) associated with the blocks.

In some cases, the memory system controller 315 may construct each block by combining two HGBs, where an HGB may be a block with a quantity of functional word lines (e.g., word lines capable of correctly writing to one or more memory cells) in a region of the block, and a quantity of nonfunctional word lines (e.g., word lines incapable of correctly writing to one or more memory cells) in another region of the block. For example, an upper HGB may include a quantity of functional word lines satisfying a threshold in an upper region of the block, and a second quantity of functional word lines not satisfying the threshold in a lower region of the block. Further, a lower HGB may include a quantity of functional word lines satisfying a threshold in a lower region of the block, and a second quantity of functional word lines not satisfying the threshold, in an upper region of the block.

In some such cases, the memory system controller 315 may construct a block by logically combining an upper HGB with a lower HGB from a same plane of a same memory die 320. In some examples, an upper deck (e.g., an upper region) of the one or more memory dies 320 may include upper HGBs across the planes of the one or more memory dies 320, and a lower deck (e.g., a lower region) of the one or more memory dies 320 may include lower HGBs across the planes of the one or more memory dies 320. For example, the upper deck may include a quantity of functional word lines spanning the upper HGBs associated with the upper deck, and the lower deck may include a quantity of functional word lines spanning the lower HGBs associated with the lower deck. In some cases, the memory system controller 315 may implement HGBs to extend a life of the memory system 310 by utilizing blocks (e.g., HGBs) for access operations that may have otherwise been retired (e.g., in prior implementations).

In some cases, the memory system controller 315 may perform write operations (e.g., in accordance with write commands from the host system 305) on one or more VBs of the memory dies 320, where each VB may be associated with a group of blocks, including blocks from each plane of the one or more memory dies 320. In some examples, a VB may span the one or more memory dies 320 such that the VB may include blocks from planes of each memory die 320. In some cases, to enable write operations to be performed on a VB (e.g., a new VB), the memory system controller 315 may first configure the VB. In some such cases, the memory system controller 315 may configure the VB to include physical blocks or blocks constructed using HGBs. For example, a VB may be configured from a group of logically combined blocks, where each block is constructed using an upper HGB and a lower HGB from a same plane of a same memory die 320. In some examples, to perform the write operations on a VB configured from a group of logically combined blocks, the memory system controller 315 may first erase the group of logically combined blocks. However, in some cases, because the VB is constructed using double the quantity of blocks (e.g., two HGBs for each block), an erase operation on the VB may consume double the amount of time. For example, an erase time per block may be 5 ms, whereas with 2 HGBs per block, an erase time for a logically combined block may be 10 ms. Therefore, erasing the blocks associated with the HGB prior to performing the write operations may cause relatively high latency associated with performing the write operations.

In accordance with operations as described herein, the memory system controller 315 may implement a deck-based erase function to mitigate the relatively high latency associated with performing the write operations on a VB configured with blocks constructed from HGBs. The deck-based erase function may include performing erase operations and write operations in alternating stages on the VB, such that a first group of HGBs (e.g., upper HGBs, lower HGBs) associated with the VB may be erased and written to before erasing and writing to a second group of HGBs associated with the VB. For example, the memory system controller 315 may erase the upper HGBs and subsequently write to the upper HGBs, before erasing the lower HGBs and subsequently writing to the lower HGBs. The operations described herein may support performing the deck-based erase function.

At 322, the host system 305 may transmit a set of write commands to the memory system 310. In some cases, the memory system controller 315 may receive the one or more write commands for the memory system 310. In some examples, the set of write commands may include data to be written to the memory dies 320. In some implementations, the memory system controller 315 may split the set of write commands into a first set of write operations and a second set of write operations, where the first set of write operations are associated with writing to the upper deck (e.g., upper HGBs) of the one or more memory dies 320 and the second set of write operations are associated with writing to the lower deck (e.g., lower HGBs) of the one or more memory dies 320.

At 324, the memory system controller 315 may configure a VB for performing the write commands. In some cases, configuring the VB may include constructing a group of blocks from upper HGBs (e.g., a first subset of blocks) and lower HGBs (e.g., a second subset of blocks) spanning the one or more memory dies 320. In some examples, constructing the blocks may include mapping logical block addresses corresponding to the respective HGBs to the VB. In some cases, the memory system controller 315 may configure the VB based on (e.g., in response to) a request from the host system 305 to configure a new VB. In some examples, the VB may be constructed from each available upper HGB and lower HGB in the one or more memory dies 320. In other examples, the VB may be constructed from a subset of the available upper HGB and a subset of the lower HGB in the one or more memory dies 320.

At 326, the memory system controller 315 may transmit a command to the one or more memory dies 320 to erase the upper deck of the one or more memory dies 320. In some cases, the command may indicate to erase the upper HGBs associated with the upper deck.

At 328, the upper HGBs may be erased. Erasing the upper HGBs may include erasing data stored in the upper HGBs from the upper deck of the one or more memory dies 320. In some cases, each upper HGB of the upper deck may be erased, regardless of whether the upper HGB is associated with the VB.

At 330, the memory system controller 315 may refrain from performing write operations on the memory dies 320 concurrently with performing step 328. For example, the memory system controller 315 may refrain from performing (e.g., pausing) the first set of write operations on the upper HGBs for a duration associated with the memory system controller 315 erasing the upper HGBs.

At 332, the memory system controller 315 may determine the data is erased from the upper HGBs. In some cases, the memory system controller 315 may determine a quantity of the data erased from the upper HGBs or a quantity of the erased upper HGBs satisfies a threshold.

At 334, the memory system controller 315 may transmit write data to the one or more memory dies 320. In some cases, the write data may be associated with the set of write commands transmitted from the host system 305. In some examples, the write data may be associated with the first set of write operations.

At 336, the memory system controller 315 may perform the first set of write operations on the upper HGBs of the one or more memory dies 320. Performing the first set of write operations may include programming the write data received at 334 to the upper HGBs of the one or more memory dies 320. In some cases, each upper HGB of the upper deck may be written to, regardless of whether the upper HGB is associated with the VB. In some examples, the upper deck may be written to until each HGB of the one or more memory dies 320 is filled with the write data.

At 338, the memory system controller 315 may determine whether the each of the upper HGBs have been filled with write data. In some cases, the memory system controller 315 may determine whether a quantity of write data associated with the first set of write operations has satisfied a threshold, or whether a quantity of upper HGBs filled with write data has satisfied a threshold. In some such cases, the memory system controller 315 may actively monitor the one or more memory dies 320 concurrently with performing the first set of write operations on the upper HGBs, such that the memory system controller 315 may provide additional write data until each upper HGB of the one or more memory dies 320 is filled.

In some cases, at 338, the memory system controller 315 may monitor the one or more memory dies 320 to identify an idle duration (e.g., a duration associated with not writing data) during performing the first set of write operations. For example, the memory system controller 315 may identify the idle duration based on (e.g., in response to) determining a duration associated with not writing data to the upper HGBs satisfies a threshold duration. In some implementations, the idle duration may be associated with a greater duration than an expected duration to erase the lower HGBs. The operations of the process flow 300 may not proceed to step 340 until the memory system controller 315 has determined that the upper HGBs are full, or until the memory system controller 315 has identified an idle duration.

At 340, the memory system controller 315 may transmit a command to the one or more memory dies 320 to erase the lower deck of the one or more memory dies 320. In some cases, the command may indicate to erase the lower HGBs associated with the lower deck. In some examples, the memory system controller 315 may not transmit the command to the one or more memory dies 320 until the memory system controller 315 has determined that the first set of write operations are completed or until the idle duration is identified.

At 342, the lower HGBs may be erased. Erasing the lower HGBs may include erasing data stored in the lower HGBs from the lower deck of the one or more memory dies 320. In some cases, each lower HGB of the lower deck may be erased, regardless of whether the lower HGB is associated with the VB.

At 344, the memory system controller 315 may refrain from performing write operations on the memory dies 320 concurrently with performing step 328. For example, the memory system controller 315 may refrain from performing the second set of write operations on the lower HGBs for a duration associated with the memory system controller 315 erasing the lower HGBs.

At 346, the memory system controller 315 may determine the data is erased from the lower HGBs. In some cases, the memory system controller 315 may determine a quantity of the data erased from the lower HGBs or a quantity of the erased lower HGBs satisfies a threshold.

At 348, the memory system controller 315 may transmit write data to the one or more memory dies 320. In some cases, the write data may be associated with the set of write commands transmitted from the host system 305. In some examples, the write data may be associated with the second set of write operations.

At 350, the memory system controller 315 may perform the second set of write operations on the lower HGBs of the one or more memory dies 320. Performing the second set of write operations may include programming the write data received at 348 to the lower HGBs of the one or more memory dies 320. In some cases, each lower HGB of the lower deck may be written to, regardless of whether the lower HGB is associated with the VB. In some examples, the lower deck may be written to until each HGB of the one or more memory dies 320 is filled with the write data.

At 352, the memory system controller 315 may determine whether the each of the lower HGBs have been filled with write data. In some cases, the memory system controller 315 may determine whether a quantity of write data associated with the second set of write operations has satisfied a threshold, or whether a quantity of lower HGBs filled with write data has satisfied a threshold. In some such cases, the memory system controller 315 may actively monitor the one or more memory dies 320 concurrently with performing the second set of write operations on the lower HGBs, such that the memory system controller 315 may provide additional write data until each lower HGB of the one or more memory dies 320 is filled or until the write data associated with the write commands is exhausted.

Performing the operations of the process flow 300 as described herein, may be associated with relatively reduced latency compared to prior implementations of HGBs. For example, by implementing the deck-based erase function, the memory system 310 may benefit from alternating erase operations and write operations, rather than waiting for all the erase operations to be completed before beginning the write operations. In some such examples, the memory system 310 may realize relatively reduced latency for performing write operations on a new VB. Therefore, the memory system 310 may benefit from implementing HGBs (e.g., to extend the operable life of the memory system 310) without increasing the latency associated with performing erase operations and write operations on the HGBs.

Figure 4:
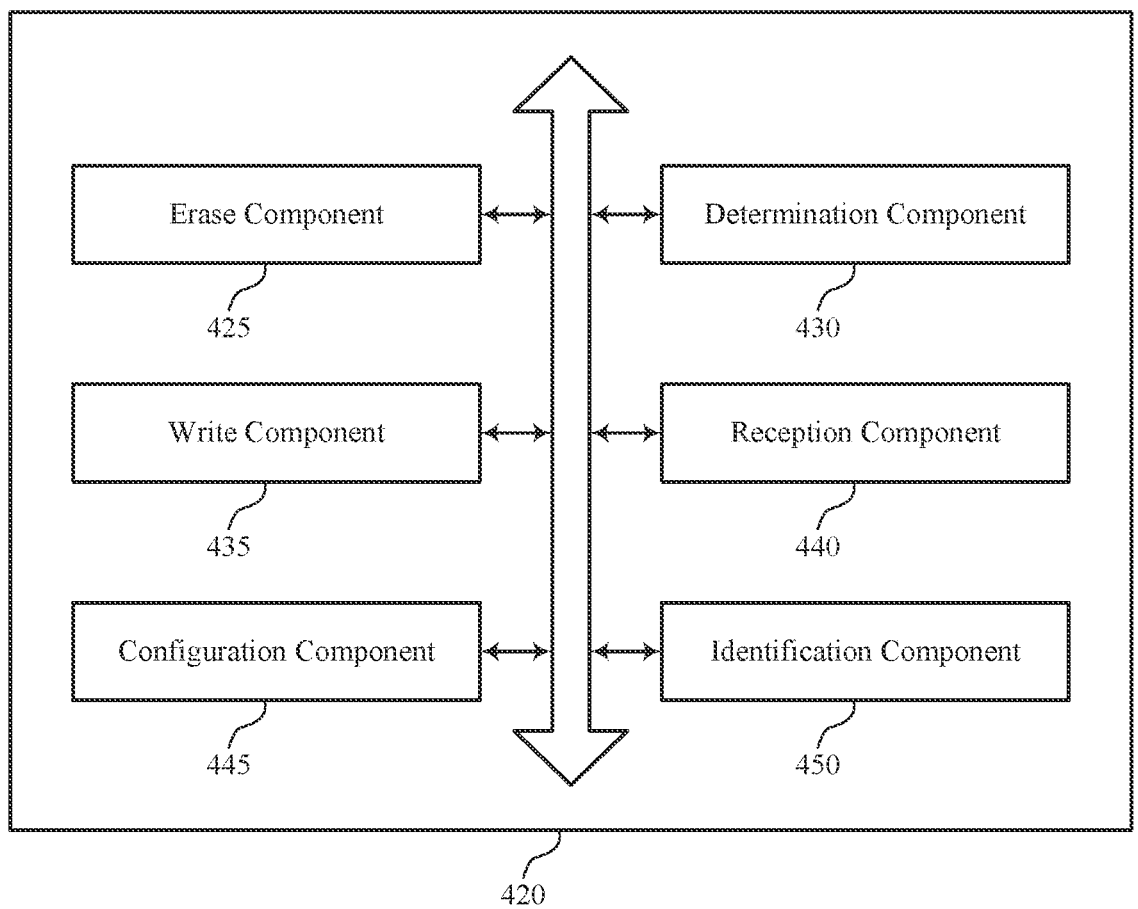
FIG. 4 illustrates a block diagram of a memory system that supports a deck-based erase function in accordance with examples as disclosed herein.

FIG. 4 illustrates a block diagram 400 of a memory system 420 that supports a deck-based erase function in accordance with examples as disclosed herein. The memory system 420 may be an example of aspects of a memory system as described with reference to FIGS. 1 through 3. The memory system 420, or various components thereof, may be an example of means for performing various aspects of a deck-based erase function as described herein. For example, the memory system 420 may include an erase component 425, a determination component 430, a write component 435, a reception component 440, a configuration component 445, an identification component 450, or any combination thereof. Each of these components may communicate, directly or indirectly, with one another (e.g., via one or more buses).

The erase component 425 may be configured as or otherwise support a means for erasing data from a first subset of blocks for configuring a VB, where the first subset of blocks is associated with a first portion of one or more memory dies of a memory system. The determination component 430 may be configured as or otherwise support a means for determining whether data is erased from each block of the first subset of blocks for configuring the VB. The write component 435 may be configured as or otherwise support a means for performing a first set of write operations on the first subset of blocks based at least in part on determining that the data is erased from each block of the first subset of blocks. In some examples, the erase component 425 may be configured as or otherwise support a means for erasing, in response to a completion of performing the first set of write operations on the first subset of blocks, data from a second subset of blocks for configuring the VB, where the second subset of blocks is associated with a second portion of the one or more memory dies. In some examples, the determination component 430 may be configured as or otherwise support a means for determining whether data is erased from each block of the second subset of blocks for configuring the VB. In some examples, the write component 435 may be configured as or otherwise support a means for performing a second set of write operations on the second subset of blocks based at least in part on determining that the data is erased from the second subset of blocks.

In some examples, the reception component 440 may be configured as or otherwise support a means for receiving, at the memory system, a set of write commands associated with the first set of write operations and the second set of write operations, where erasing data from the first subset of blocks, performing the first set of write operations, erasing the data from the second subset of blocks, or performing the second set of write operations, or any combination thereof, is based at least in part on receiving the set of write commands.

In some examples, the configuration component 445 may be configured as or otherwise support a means for configuring a set of blocks including the first subset of blocks and the second subset of blocks as the VB based at least in part on a command.

In some examples, the identification component 450 may be configured as or otherwise support a means for identifying an idle duration while performing the first set of write operations, where erasing the data from the second subset of blocks is based at least in part on identifying the idle duration.

In some examples, the write component 435 may be configured as or otherwise support a means for refraining from performing the first set of write operations and the second set of write operations for a first duration associated with erasing the data from the first subset of blocks. In some examples, the write component 435 may be configured as or otherwise support a means for refraining from performing the second set of write operations for a second duration associated with erasing the data from the second subset of blocks.

In some examples, the determination component 430 may be configured as or otherwise support a means for determining whether a quantity of the data in the first subset of blocks satisfies a threshold based at least in part on performing the first set of write operations, where erasing the data from the second subset of blocks is based at least in part on determining whether the quantity of the data satisfies the threshold.

In some examples, the first portion is associated with a first set of functional word lines of the one or more memory dies, and the second portion is associated with a second set of functional word lines of the one or more memory dies.

In some examples, the first portion is associated with a third set of non-functional word lines of the one or more memory dies, and the second portion is associated with a fourth set of non-functional word lines of the one or more memory dies.

In some examples, the first set of functional word lines is associated with an upper deck of the one or more memory dies, and the second set of functional word lines is associated with a lower deck of the one or more memory dies.

In some examples, each block of the first subset of blocks is an upper HGB, and each block of the second subset of blocks is a lower HGB.

Figure 5:
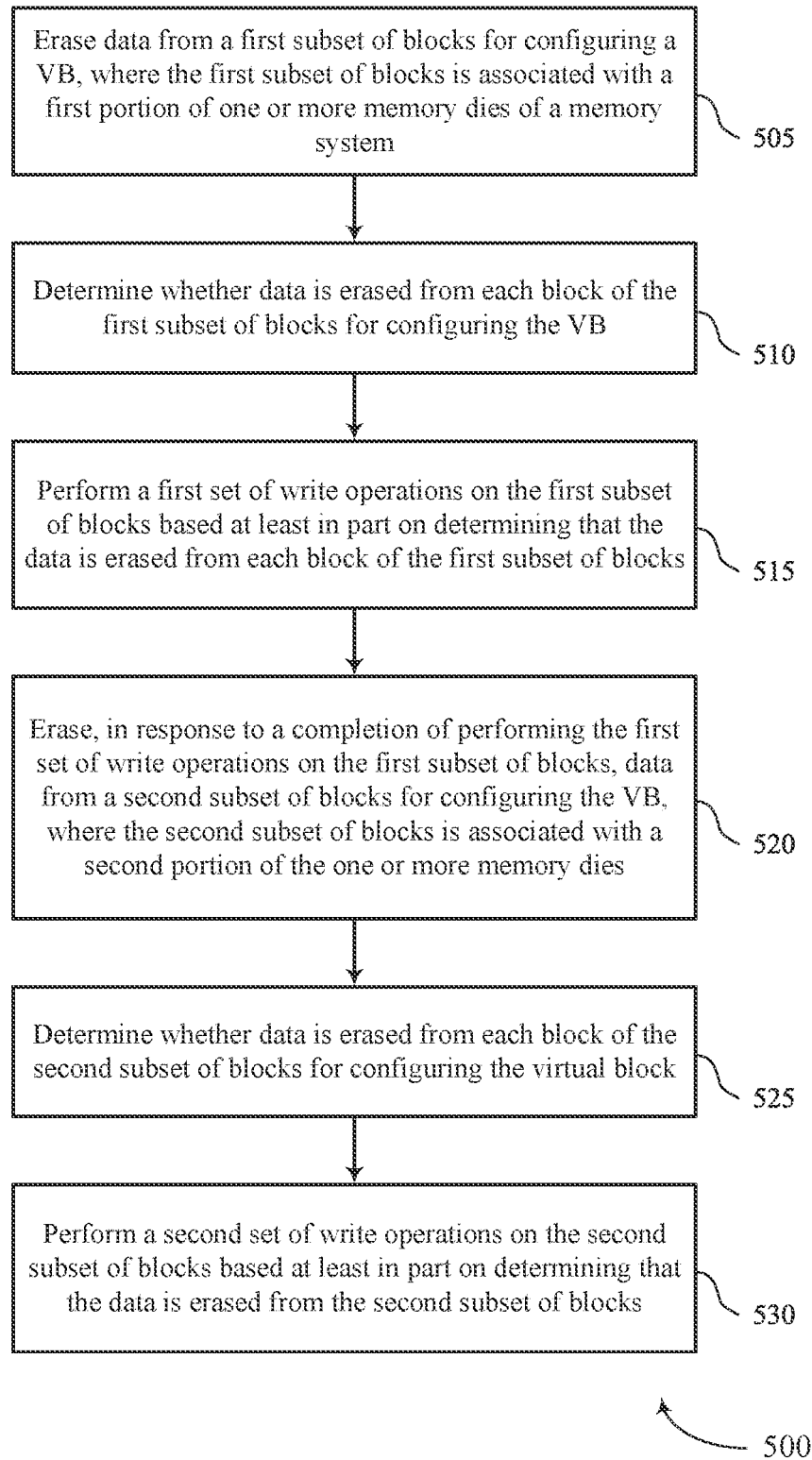
FIG. 5 illustrates a flowchart showing a method or methods that support a deck-based erase function in accordance with examples as disclosed herein.

FIG. 5 illustrates a flowchart showing a method 500 that supports a deck-based erase function in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include erasing data from a first subset of blocks for configuring a VB, where the first subset of blocks is associated with a first portion of one or more memory dies of a memory system. The operations of 505 may be performed in accordance with examples as disclosed herein. In some examples, aspects of the operations of 505 may be performed by an erase component 425 as described with reference to FIG. 4.

At 510, the method may include determining whether data is erased from each block of the first subset of blocks for configuring the VB. The operations of 510 may be performed in accordance with examples as disclosed herein. In some examples, aspects of the operations of 510 may be performed by a determination component 430 as described with reference to FIG. 4.

At 515, the method may include performing a first set of write operations on the first subset of blocks based at least in part on determining that the data is erased from each block of the first subset of blocks. The operations of 515 may be performed in accordance with examples as disclosed herein. In some examples, aspects of the operations of 515 may be performed by a write component 435 as described with reference to FIG. 4.

At 520, the method may include erasing, in response to a completion of performing the first set of write operations on the first subset of blocks, data from a second subset of blocks for configuring the VB, where the second subset of blocks is associated with a second portion of the one or more memory dies. The operations of 520 may be performed in accordance with examples as disclosed herein. In some examples, aspects of the operations of 520 may be performed by an erase component 425 as described with reference to FIG. 4.

At 525, the method may include determining whether data is erased from each block of the second subset of blocks for configuring the VB. The operations of 525 may be performed in accordance with examples as disclosed herein. In some examples, aspects of the operations of 525 may be performed by a determination component 430 as described with reference to FIG. 4.

At 530, the method may include performing a second set of write operations on the second subset of blocks based at least in part on determining that the data is erased from the second subset of blocks. The operations of 530 may be performed in accordance with examples as disclosed herein. In some examples, aspects of the operations of 530 may be performed by a write component 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for erasing data from a first subset of blocks for configuring a VB, where the first subset of blocks is associated with a first portion of one or more memory dies of a memory system; determining whether data is erased from each block of the first subset of blocks for configuring the VB; performing a first set of write operations on the first subset of blocks based at least in part on determining that the data is erased from each block of the first subset of blocks; erasing, in response to a completion of performing the first set of write operations on the first subset of blocks, data from a second subset of blocks for configuring the VB, where the second subset of blocks is associated with a second portion of the one or more memory dies; determining whether data is erased from each block of the second subset of blocks for configuring the VB; and performing a second set of write operations on the second subset of blocks based at least in part on determining that the data is erased from the second subset of blocks.

Aspect 2: The method, apparatus, or non-transitory computer-readable medium of aspect 1, further including operations, features, circuitry, logic, means, or instructions, or any combination thereof for receiving, at the memory system, a set of write commands associated with the first set of write operations and the second set of write operations, where erasing data from the first subset of blocks, performing the first set of write operations, erasing the data from the second subset of blocks, or performing the second set of write operations, or any combination thereof, is based at least in part on receiving the set of write commands.

Aspect 3: The method, apparatus, or non-transitory computer-readable medium of any of aspects 1 through 2, further including operations, features, circuitry, logic, means, or instructions, or any combination thereof for configuring a set of blocks including the first subset of blocks and the second subset of blocks as the VB based at least in part on a command.

Aspect 4: The method, apparatus, or non-transitory computer-readable medium of any of aspects 1 through 3, further including operations, features, circuitry, logic, means, or instructions, or any combination thereof for identifying an idle duration while performing the first set of write operations, where erasing the data from the second subset of blocks is based at least in part on identifying the idle duration.

Aspect 5: The method, apparatus, or non-transitory computer-readable medium of any of aspects 1 through 4, further including operations, features, circuitry, logic, means, or instructions, or any combination thereof for refraining from performing the first set of write operations and the second set of write operations for a first duration associated with erasing the data from the first subset of blocks and refraining from performing the second set of write operations for a second duration associated with erasing the data from the second subset of blocks.

Aspect 6: The method, apparatus, or non-transitory computer-readable medium of any of aspects 1 through 5, further including operations, features, circuitry, logic, means, or instructions, or any combination thereof for determining whether a quantity of the data in the first subset of blocks satisfies a threshold based at least in part on performing the first set of write operations, where erasing the data from the second subset of blocks is based at least in part on determining whether the quantity of the data satisfies the threshold.

Aspect 7: The method, apparatus, or non-transitory computer-readable medium of any of aspects 1 through 6, where the first portion is associated with a first set of functional word lines of the one or more memory dies, and the second portion is associated with a second set of functional word lines of the one or more memory dies.

Aspect 8: The method, apparatus, or non-transitory computer-readable medium of aspect 7, where the first portion is associated with a third set of non-functional word lines of the one or more memory dies, and the second portion is associated with a fourth set of non-functional word lines of the one or more memory dies.

Aspect 9: The method, apparatus, or non-transitory computer-readable medium of any of aspects 7 through 8, where the first set of functional word lines is associated with an upper deck of the one or more memory dies, and the second set of functional word lines is associated with a lower deck of the one or more memory dies.

Aspect 10: The method, apparatus, or non-transitory computer-readable medium of any of aspects 1 through 9, where each block of the first subset of blocks is an upper HGB, and each block of the second subset of blocks is a lower HGB.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a memory system comprising one or more memory dies; and
a controller coupled with the memory system and configured to cause the apparatus to:
erase data from a first subset of blocks for configuring a virtual block, wherein the first subset of blocks is associated with a first portion of the one or more memory dies;
determine whether data is erased from each block of the first subset of blocks for configuring the virtual block;
perform a first set of write operations on the first subset of blocks based at least in part on determining that the data is erased from each block of the first subset of blocks;
erase, in response to a completion of performing the first set of write operations on the first subset of blocks, data from a second subset of blocks for configuring the virtual block, wherein the second subset of blocks is associated with a second portion of the one or more memory dies;
determine whether data is erased from each block of the second subset of blocks for configuring the virtual block; and
perform a second set of write operations on the second subset of blocks based at least in part on determining that the data is erased from the second subset of blocks.

2. The apparatus of claim 1, wherein the controller is further configured to cause the apparatus to:
receive, at the memory system, a set of write commands associated with the first set of write operations and the second set of write operations, wherein to erase data from the first subset of blocks, perform the first set of write operations, erase the data from the second subset of blocks, or perform the second set of write operations, or any combination thereof, is based at least in part on the set of write commands.

3. The apparatus of claim 1, wherein the controller is further configured to cause the apparatus to:
configure a set of blocks comprising the first subset of blocks and the second subset of blocks as the virtual block based at least in part on a command.

4. The apparatus of claim 1, wherein the controller is further configured to cause the apparatus to:
identify an idle duration while performing the first set of write operations, wherein to erase the data from the second subset of blocks is based at least in part on the idle duration.

5. The apparatus of claim 1, wherein the controller is further configured to cause the apparatus to:
refrain from performing the first set of write operations and the second set of write operations for a first duration associated with erasing the data from the first subset of blocks; and
refrain from performing the second set of write operations for a second duration associated with erasing the data from the second subset of blocks.

6. The apparatus of claim 1, wherein the controller is further configured to cause the apparatus to:
determine whether a quantity of the data in the first subset of blocks satisfies a threshold based at least in part on performing the first set of write operations, wherein to erase the data from the second subset of blocks is based at least in part on whether the quantity of the data satisfies the threshold.

7. The apparatus of claim 1, wherein the first portion is associated with a first set of functional word lines of the one or more memory dies, and the second portion is associated with a second set of functional word lines of the one or more memory dies.

8. The apparatus of claim 7, wherein the first portion is associated with a third set of non-functional word lines of the one or more memory dies, and the second portion is associated with a fourth set of non-functional word lines of the one or more memory dies.

9. The apparatus of claim 7, wherein the first set of functional word lines is associated with an upper deck of the one or more memory dies, and the second set of functional word lines is associated with a lower deck of the one or more memory dies.

10. The apparatus of claim 1, wherein each block of the first subset of blocks is an upper half good block, and each block of the second subset of blocks is a lower half good block.

11. A non-transitory computer-readable medium storing code comprising instructions which, when executed by a processor of an electronic device, cause the electronic device to:
erase data from a first subset of blocks for configuring a virtual block, wherein the first subset of blocks is associated with a first portion of one or more memory dies of a memory system;
determine whether data is erased from each block of the first subset of blocks for configuring the virtual block;
perform a first set of write operations on the first subset of blocks based at least in part on determining that the data is erased from each block of the first subset of blocks;
erase, in response to a completion of performing the first set of write operations on the first subset of blocks, data from a second subset of blocks for configuring the virtual block, wherein the second subset of blocks is associated with a second portion of the one or more memory dies;
determine whether data is erased from each block of the second subset of blocks for configuring the virtual block; and
perform a second set of write operations on the second subset of blocks based at least in part on determining that the data is erased from the second subset of blocks.

12. The non-transitory computer-readable medium of claim 11, wherein the instructions, when executed by the processor of the electronic device, further cause the electronic device to:
receive, at the memory system, a set of write commands associated with the first set of write operations and the second set of write operations, wherein to erase data from the first subset of blocks, perform the first set of write operations, erase the data from the second subset of blocks, or perform the second set of write operations, or any combination thereof, is based at least in part on the set of write commands.

13. The non-transitory computer-readable medium of claim 11, wherein the instructions, when executed by the processor of the electronic device, further cause the electronic device to:
configure a set of blocks comprising the first subset of blocks and the second subset of blocks as the virtual block based at least in part on a command.

14. The non-transitory computer-readable medium of claim 11, wherein the instructions, when executed by the processor of the electronic device, further cause the electronic device to:
identify an idle duration while performing the first set of write operations, wherein erasing the data from the second subset of blocks is based at least in part on the idle duration.

15. The non-transitory computer-readable medium of claim 11, wherein the instructions, when executed by the processor of the electronic device, further cause the electronic device to:
refrain from performing the first set of write operations and the second set of write operations for a first duration associated with erasing the data from the first subset of blocks; and
refrain from performing the second set of write operations for a second duration associated with erasing the data from the second subset of blocks.

16. The non-transitory computer-readable medium of claim 11, wherein the instructions, when executed by the processor of the electronic device, further cause the electronic device to:
determine whether a quantity of the data in the first subset of blocks satisfies a threshold based at least in part on performing the first set of write operations, wherein to erase the data from the second subset of blocks is based at least in part on whether the quantity of the data satisfies the threshold.

17. The non-transitory computer-readable medium of claim 11, wherein the first portion is associated with a first set of functional word lines of the one or more memory dies, and the second portion is associated with a second set of functional word lines of the one or more memory dies.

18. The non-transitory computer-readable medium of claim 17, wherein the first set of functional word lines is associated with an upper deck of the one or more memory dies, and the second set of functional word lines is associated with a lower deck of the one or more memory dies.

19. The non-transitory computer-readable medium of claim 11, wherein each block of the first subset of blocks is an upper half good block, and each block of the second subset of blocks is a lower half good block.

20. A method, comprising:
erasing data from a first subset of blocks for configuring a virtual block, wherein the first subset of blocks is associated with a first portion of one or more memory dies of a memory system;
determining whether data is erased from each block of the first subset of blocks for configuring the virtual block;
performing a first set of write operations on the first subset of blocks based at least in part on determining that the data is erased from each block of the first subset of blocks;
erasing, in response to a completion of performing the first set of write operations on the first subset of blocks, data from a second subset of blocks for configuring the virtual block, wherein the second subset of blocks is associated with a second portion of the one or more memory dies;
determining whether data is erased from each block of the second subset of blocks for configuring the virtual block; and
performing a second set of write operations on the second subset of blocks based at least in part on determining that the data is erased from the second subset of blocks.

* * * * *